(12) United States Patent
McIntyre et al.

(10) Patent No.: US 7,684,995 B2
(45) Date of Patent: Mar. 23, 2010

(54) METHOD OF PERMITTING GROUP ACCESS TO ELECTRONICALLY STORED IMAGES AND TRANSACTION CARD USED IN THE METHOD

(75) Inventors: Dale F. McIntyre, Honeoye Falls, NY (US); Joseph A. Manico, Rochester, NY (US); Andrew T. Cooper, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 1351 days.

(21) Appl. No.: 11/106,971

(22) Filed: Apr. 15, 2005

(65) Prior Publication Data

US 2005/0182652 A1 Aug. 18, 2005

Related U.S. Application Data

(63) Continuation of application No. 09/470,814, filed on Dec. 22, 1999, now Pat. No. 6,950,800.

(51) Int. Cl.
*G06Q 10/00* (2006.01)
(52) U.S. Cl. ........................................ 705/1
(58) Field of Classification Search ................ 705/1
See application file for complete search history.

(56) References Cited

U.S. PATENT DOCUMENTS

| 5,531,482 | A | * | 7/1996 | Blank | 283/67 |
| 5,903,633 | A | * | 5/1999 | Lorsch | 379/114.2 |
| 6,568,595 | B1 | * | 5/2003 | Russell et al. | 235/462.01 |

FOREIGN PATENT DOCUMENTS

EP 790528 A1 * 8/1997

OTHER PUBLICATIONS

Wedding Photos at the Click of a Mouse, Nov. 4, 1998, Omaha World—Herald, p. 15.*

* cited by examiner

*Primary Examiner*—Naresh Vig
(74) *Attorney, Agent, or Firm*—Frank Pincelli; Eugene I. Shkurko

(57) ABSTRACT

A method of storing and viewing a collection of digital images includes the steps of: providing a plurality of users with a unique user ID associated with a URL identifying a network photoservice provider; providing each one of the plurality of users with a separate password to the unique user ID; at least one of the plurality of users transferring a set of digital images to the unique user ID employing their separate passwords; and viewing the images located at the unique user ID using the separate password.

4 Claims, 15 Drawing Sheets

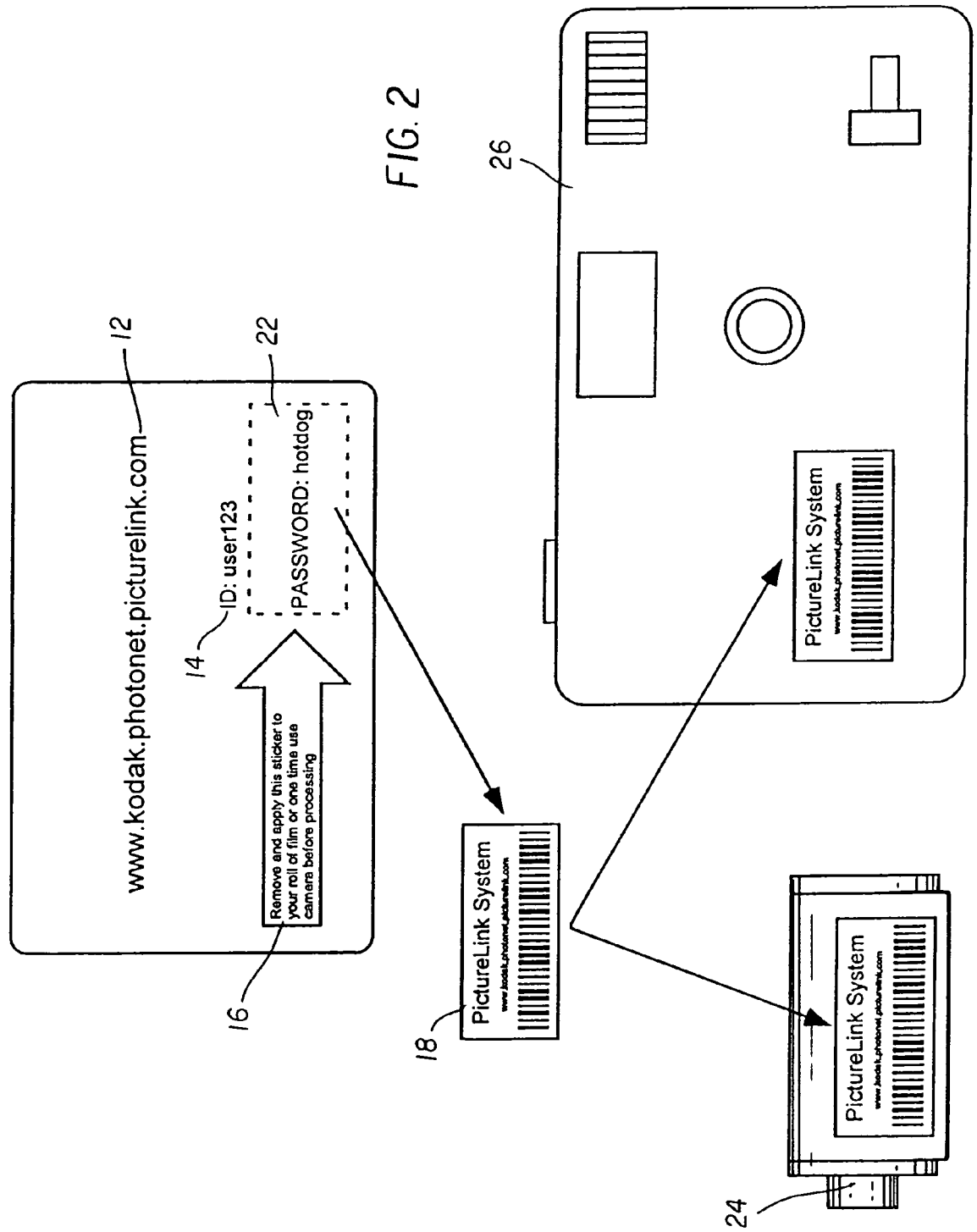

METHOD OF PERMITTING GROUP ACCESS TO ELECTRONICALLY STORED IMAGES AND TRANSACTION CARD USED IN THE METHOD

CROSS REFERENCE TO RELATED APPLICATIONS

This is a continuation of application Ser. No. 09/470,814 filed Dec. 22, 1999 now U.S. Pat. No. 6,950,800.

FIELD OF THE INVENTION

The present invention relates to digital image generation, storage and retrieval, and more particularly to a method for enabling a group of individuals to generate and share a collection of digital images.

BACKGROUND OF THE INVENTION

Photographic services including image digitization, digital image storage and network access to digital image files and distribution of digital image files are currently provided by on-line photocenters such as the KODAK PhotoNet™ Online service available on the Internet at http://kodak.photonet.com. To use this system, the photographer checks a box on a photofinishing order envelope indicating she would like to receive this service. The photofinisher processes the film, scans the film to produce digital images, and uploads the digital images to the on-line photocenter via an FTP (file transfer protocol) site through an Internet server. The on-line photocenter receives the digital images and stores them as image files in a mass storage device such as a Sun ultra 250 mass storage hard drive connected to an Internet server.

The on-line photocenter assigns the image file a roll ID number, and an OwnerKey which functions as a location indicator and password so that the photographer can access the image file over the Internet, and sends the roll ID number and OwnerKey back to the photofinisher. The photofinisher prints a receipt listing the roll ID number, and an OwnerKey and returns the receipt along with the printed photographs to the photographer.

The photographer then access the on-line photocenter from an Internet capable personal computer, supplying the on-line photocenter with her e-mail address, personal password, roll ID number and OwnerKey. The on-line photocenter then allows her access to the stored images, from which she can download the images to the personal computer, authorize other people's access to the digital images by providing their e-mail addresses to the on-line photocenter, order reprints, specialty products, digitally manipulate images, and perform other functions. It will be readily appreciated that the entry of so many codes and addresses complicates the use of the services provided by the on-line photocenter.

Special events such as family reunions weddings and amateur sporting events (e.g. little league) typically have multiple photographers with common interests capturing photographs at the event. Current methods of sharing the images captured at the event include making multiple prints from each roll of exposed film and using either personal contact or the postal system to share the pictures. If an on-line photocenter is used to share the images, individual users need to obtain each others e-mail addresses and then access the on-line photocenter and authorize each other's access to the image files. Each user at the event needs to perform this procedure and all the images taken at the event would be dispersed over multiple locations at the on-line photocenter. An additional problem occurs when a photographer does not wish to share all of the images captured on a roll of film, for example because some of the images are from another event, are personal, or are inappropriate for sharing.

There is an additional need for photographers who use digital cameras to participate in the same system. Currently in the on-line photocenters, a user can purchase on-line storage space for the equivalent of a roll of film and then upload digital images from their own computer. However, these images are still dispersed and subject to the problems of connecting groups of users that have experienced a common event.

Furthermore, consumer photographers who are not connected to the Internet can't participate within the existing on-line photocenter structure. There is a need to provide these unconnected users with a way to share and print the pictures of the event they participated in without causing them to sit with a connected user and manually keep track of products purchased and the expenses incurred.

There is a need therefore for an improved method to conveniently enable a group of photographers to generate and share a file of digital images on the Internet.

SUMMARY OF THE INVENTION

It is an object of the present invention to provide a transaction card for coordinating access to digital image files, comprising:

a) a support sheet upon which is printed a URL identifying a network photoservice provider, and a unique user ID; and b) a magnetic stripe disposed thereon, the stripe having recorded thereon the URL, the unique user ID and the password.

It is another object of the present invention to provide a transaction card for coordinating access to digital image files, comprising:

a) a support sheet upon which is printed instructions for use of the transaction card, a URL identifying a network photoservice provider, a unique user ID and a password in human readable form; and b) a removable adhesive-backed label adapted to be adhered to a roll of film or one-time-use camera affixed to the support so as to obscure at least the password, the label bearing a machine readable URL identifying the network photoservice provider and the user ID.

Another aspect of the present invention is a system for coordinating access to digital image files including:

a) a transaction card comprising:
  1) a support sheet upon which is printed instructions for use of the transaction card, a URL identifying a network photoservice provider, a unique user ID in human readable form;
  2) a magnetic stripe disposed thereon, the stripe having recorded thereon the URL, the unique user ID; and b) a photofinishing card containing the password in human readable form to the unique user ID.

Another aspect of the present invention is a system for coordinating access to digital image files including:

a) a transaction card comprising:
  1) a support sheet upon which is printed instructions for use of the transaction card, a URL identifying a network photoservice provider, a unique user ID in human readable form;
  2) a removable adhesive-backed label adapted to be adhered to a roll of film or one-time-use camera affixed to the support so as to obscure the user ID, the label bearing a machine readable file transfer protocol identifying the network photoservice provider and the user ID; and b) a photofinishing card containing the password in human readable form to the unique user ID.

Another aspect of the present invention is a kit containing a plurality of transaction cards, each of the transaction cards comprising:

a) a support sheet upon which is printed instructions for use of the transaction card, a URL identifying a network photoservice provider, a unique user ID, all of the transaction cards having the same user ID and a password, each of the passwords being different; and b) a magnetic stripe disposed thereon, the stripe having recorded thereon the URL, the unique user ID and the password Another object of the present invention is a kit containing a plurality of transaction cards, each of the transaction cards comprising:

a) a support sheet upon which is printed instructions for use of the transaction card, a URL identifying a network photoservice provider, a unique user ID, all of the transaction cards having the same user ID and a password in human readable form, each of the passwords being different; and b) a removable adhesive-backed label adapted to be adhered to a roll of film or one-time-use camera affixed to the support so as to obscure at least the password, the label bearing a machine readable file transfer protocol identifying the network photoservice provider and the user ID.

Another aspect of the present invention is a mail in card containing a preprinted URL and a user ID indicating the location on a network of a collection of digital images for registering a user for access to photoservices relating to the digital images.

Another aspect of the present invention is a method for providing access to a collection of digital images from a sponsored event, comprising the steps of:

a) providing, by a sponsor a transaction card to a plurality of users, having printed thereon a URL indicating the location of the collection of digital images on the Internet relating to a sponsored event;

b) at least one of the plurality of users transferring a set of digital images to the URL; and c) viewing the images located at the URL.

Another aspect of the present invention is a transaction card for coordinating access to digital image files, comprising:

a) a support sheet upon which is printed instructions for use of the transaction card, a URL identifying a network photoservice provider, a unique user ID and a password in human readable form; and b) a plurality of removable adhesive-backed labels adapted to be adhered to rolls of film or one-time-use cameras affixed to the support so as to obscure at least the password, the labels bearing a machine readable URL identifying the network photoservice provider and the user ID.

Another aspect of the present invention is an index print for selecting fulfillment from a collection of digital images said index print including a preprinted URL and a user ID indicating the location on a network of a collection of digital images.

BRIEF DESCRIPTION OF THE DRAWINGS

FIG. 2 shows the transaction card of FIG. 1 with the adhesive label removed to reveal the user ID number and password, the adhesive label shown applied to a film cartridge and a one time use camera;

DETAILED DESCRIPTION OF THE INVENTION

Figure 1:
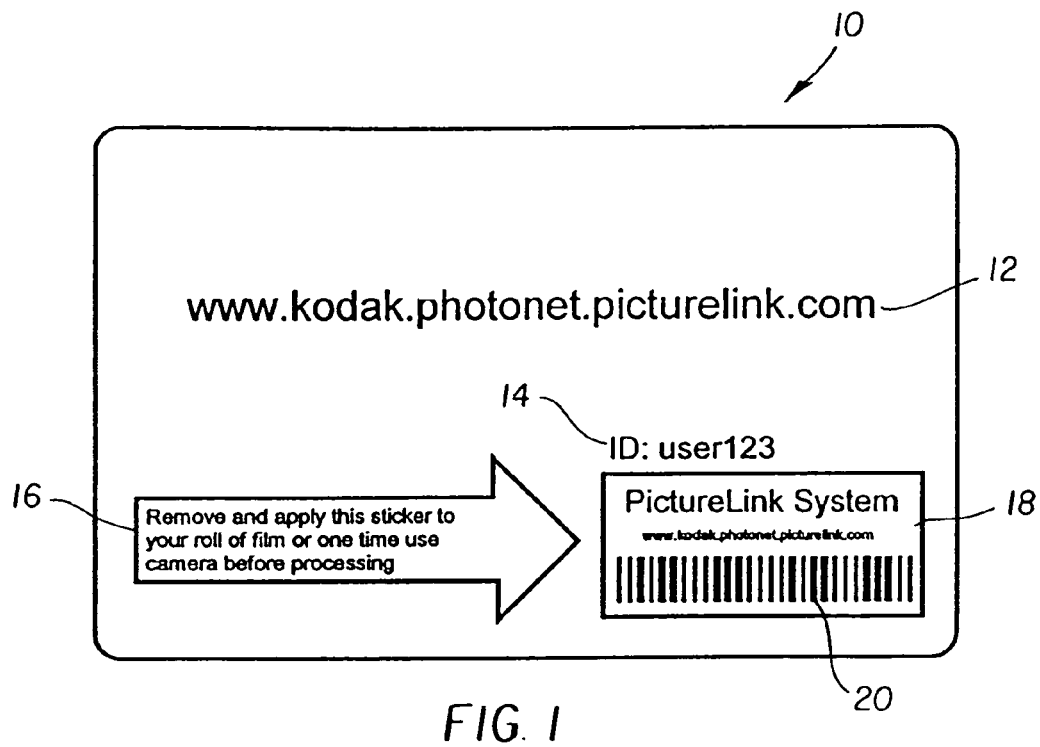
FIG. 1 shows a transaction card according to the present invention.

Referring to FIGS. 1 and 2, a transaction card 10 is shown. Printed on one side of transaction card 10 is a Universal Resource Locator (URL) 12, a user ID 14, and instructions 16. Removably adhered to the transaction card 10 is an adhesive label 18 which includes a bar code 20 for encoding the URL 12, user ID 14, and a password 22. Adhesive label 18 obscures a human readable version of password 22 until the adhesive label 18 is removed for attachment to a film cartridge 24 or a one time use camera 26. It should be apparent to one skilled in the art that instructions 16 could be printed on a protective translucent plastic overwrap (not shown) for each card and will be considered within the scope of the invention.

Figure 3:
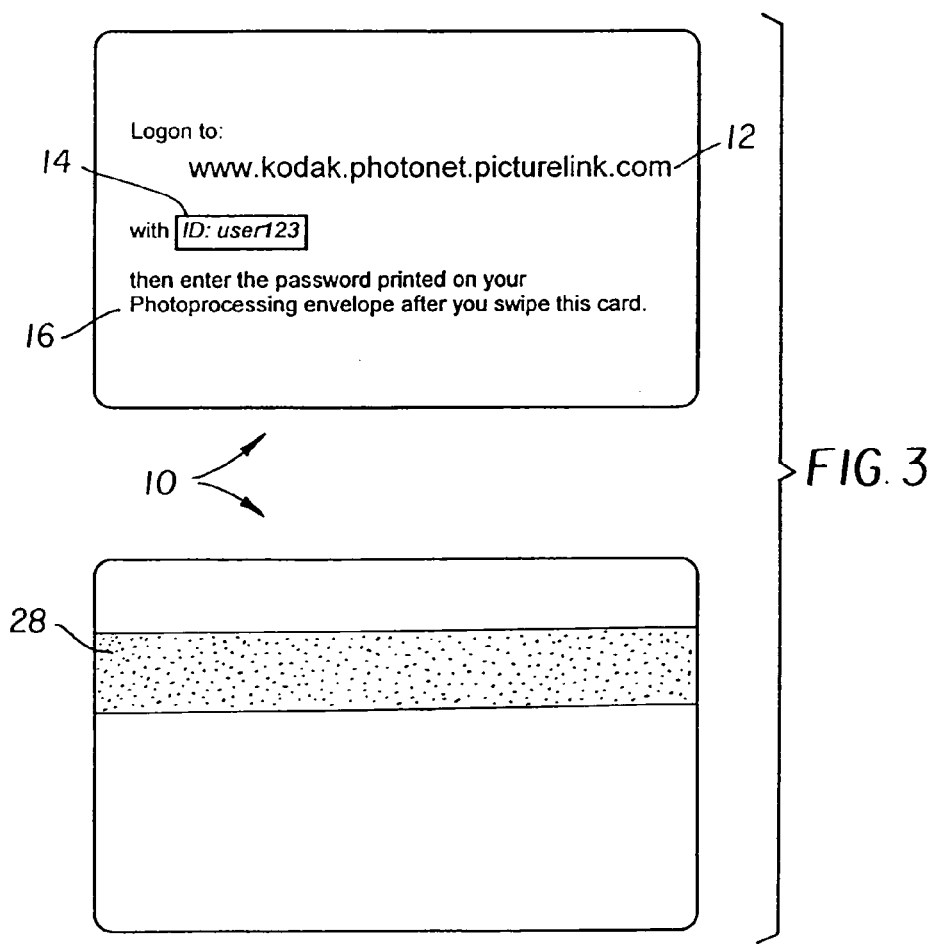
FIG. 3 shows a front and back view of an alternative embodiment of the transaction card of the present invention.

In FIG. 3, an alternative embodiment of transaction card 10 is shown with magnetic stripe 28 wherein URL 12, user ID 14 and password 22 are encoded, for example on the back of the card. Instructions 16, user ID 14 and URL 12 are printed on the front of transaction card 10 in human readable form. In this embodiment, the information on magnetic stripe 28 causes adhesive label 18 to be printed for application on the film cartridge 24 or one time use camera 26.

A further embodiment using the structure of FIG. 3 is also possible where the above-referenced information on magnetic stripe 28 is scanned at a retail terminal such as a Kodak Picture Center™ and the adhesive label 18 is printed by a printer 208 associated with the retail terminal 206. The printed adhesive label 18 is then applied to photoprocessing envelope 210 which will be discussed further with respect to FIG. 17 below.

According to a still further embodiment, the transaction card 10 may be provided by an event sponsor, such as a NASCAR or NBA event, and include printed advertising on the face of the transaction card 10. The URL 12 may contain event specific digital images provided by the sponsor for viewing and use by event participants. It is anticipated that the event sponsors would provide the cards to event participants for free or as a premium for admission to the event. The URL 12 contains linkage to the sponsors web site. All of the images that are submitted for photoprocessing with the label 18 will be viewable by all of the participants. Alternatively, the sponsor may make all of the images available for viewing by the general public via the sponsors web site.

Figure 4:
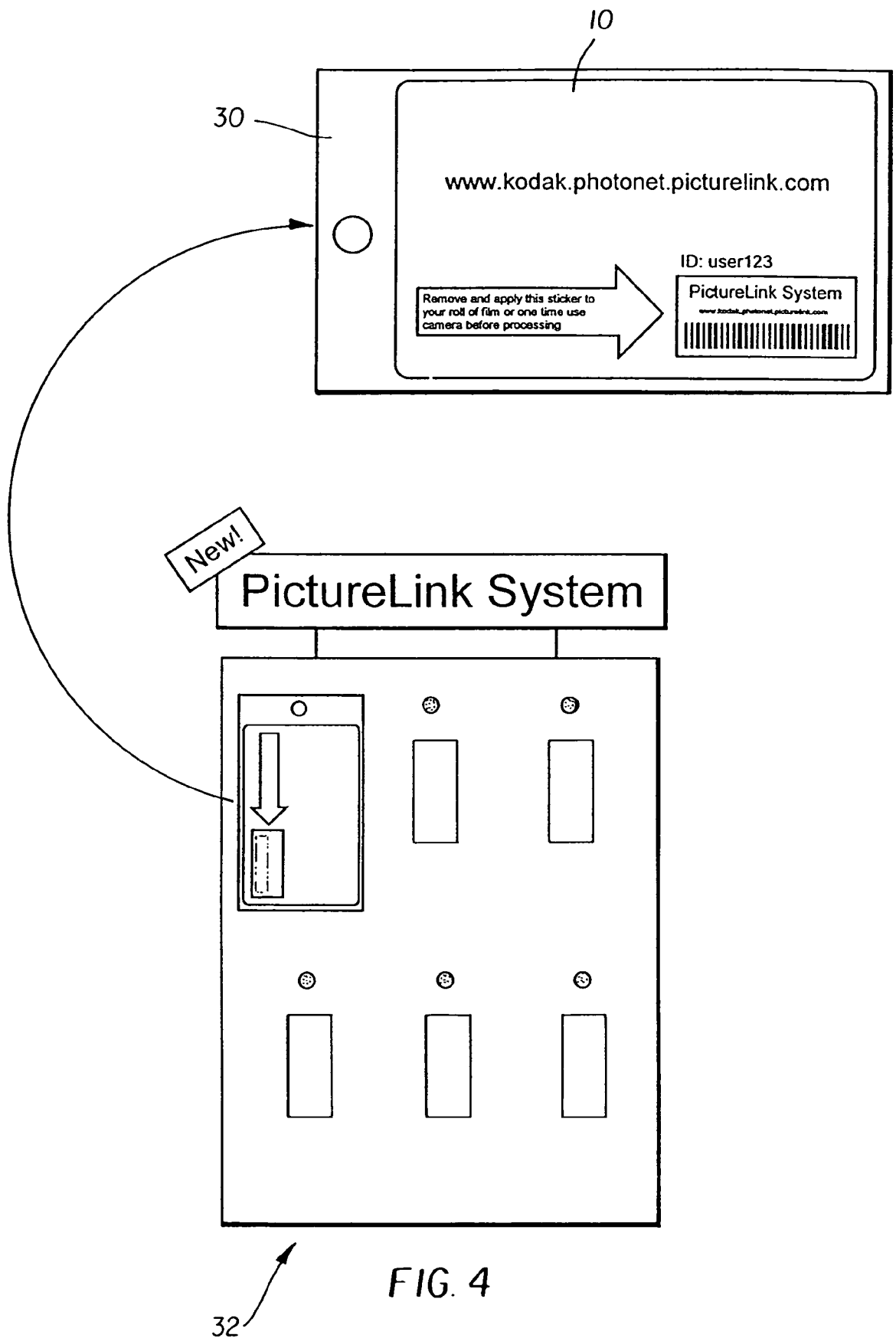
FIG. 4 shows a display rack having sealed packs containing sets of preprinted transaction cards.

Continuing on with FIG. 4, a package 30 of transaction cards 10 is shown as part of display rack 32. Each package 30 of transaction cards 10 contains multiple transaction cards 10 each transaction card 10 within the package 30 of transaction cards 10 containing the same user ID 14 but distinct passwords 22. After purchasing the package 30 of transaction cards 10, the event host (purchaser of the package 30) distributes the transaction cards 10 to event participants.

Figure 5:
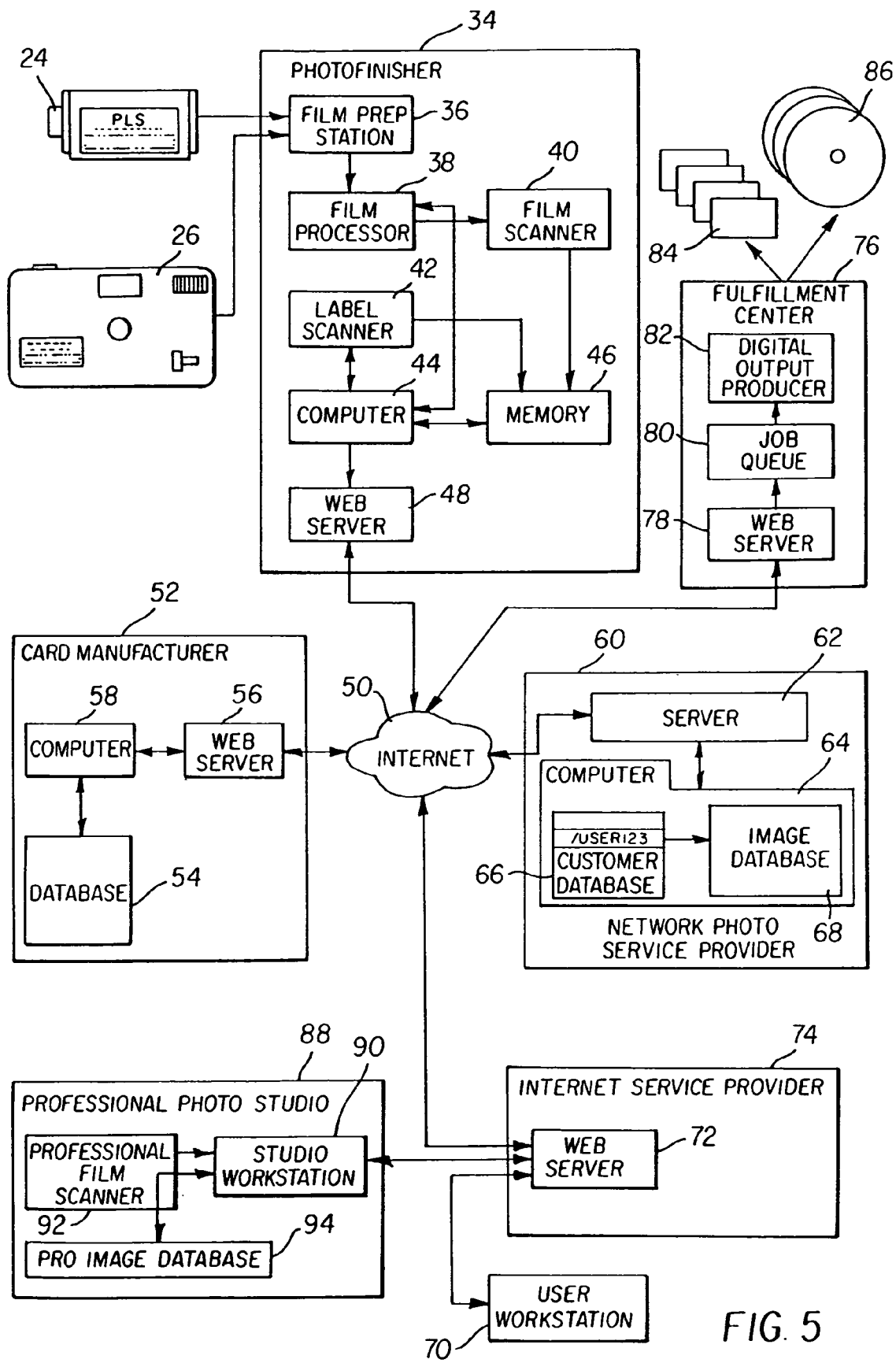
FIG. 5 is a block diagram showing a network system useful in performing the method of the present invention.

Referring to FIG. 5, a network system useful in performing the method of the present invention will be described. A film cartridge 24 or a one-time use camera 26 having an adhesive label 18 is delivered to a photofinisher 34. The photofinisher includes a film preparation station 36, a film processor 38, a film scanner 40, a label scanner 42, a computer 44 for controlling the photofinishing operation, a memory 46 for storing digital images and user ID information and a web server 48.

The adhesive label 18 is scanned in the label scanner 42, and the film is developed in the film processor 38 and scanned in film scanner 40 to produce digital images from the images recorded on the film. The digital images are stored in memory 46 along with the associated user ID 14 information. The contents of memory 46 are made available on the Internet 50 via web server 48.

The card manufacturer 52 that made the transaction cards 10 includes a database 54 connected to a web server 56 by a computer 58. The database 54 contains a list of user ID numbers 14 and associated passwords 22 (see FIG. 2).

A networked photoservice provider 60 includes a web server 62, and a computer 64, which contains a customer database 66 that points to images stored in an image database 68. Digital images and associated customer ID information are downloaded from the memory 46 in the photofinisher 34 to the customer and image databases 66 and 68 respectively in the network photoservice provider 60.

When a user desires to access digital images that were stored by himself or others at the event, he employs user workstation 70 via a web server 72 at an Internet service provider 74 using the user ID 14 and password 22 to address the web server 62 and gain access through the customer database 66 using the password 22 to access the images stored on database 68.

A fulfillment center 76 includes a web server 78, a job queue memory buffer 80 and a digital output device 82, such as an ink jet printer, CD writer, floppy disc writer, digital photographic printer, etc. If the customer desires a print 84, an article such as a CD 86, prints, poster prints, t-shirts, CD's, floppy discs, album pages, greeting cards, digital file downloading, extended image storage, mugs, posting to a web page, postage stamps, masks, sticker prints, and trading cards, bearing the image (not shown), the customer can order the print or article via the Internet using a digital order form (not shown) provided by the network photoservice provider 60. The network photoservice provider 60 receives the order and forwards it via the Internet 50 to the fulfillment center 76. The fulfillment center 76, retrieves the requested digital images from the network photoservice provider 60, produces the ordered print or article and sends it to an address supplied by the customer.

Optionally, a professional photo studio 88 having a studio digital image work station 90 connected to professional film scanner 92, such as a Kodak RFS2035 Professional film scanner, a high resolution professional digital image database 94 is connected to the network photoservice provider 60 and image fulfillment center 76. A photographer from the professional studio 88 may participate in the event and capture images using conventional or electronic cameras (not shown). The images captured by the professional are stored in database 94. If the images are captured on conventional film, they are developed and scanned by scanner 92. If they are captured on an electronic camera, they are downloaded to database 94 in a known manner.

Figure 6A:
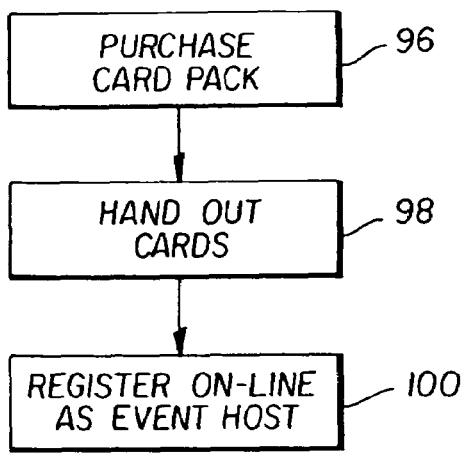
FIG. 6a is a flow chart showing the steps in the method that an event host completes according to the present invention.
Figure 6B:
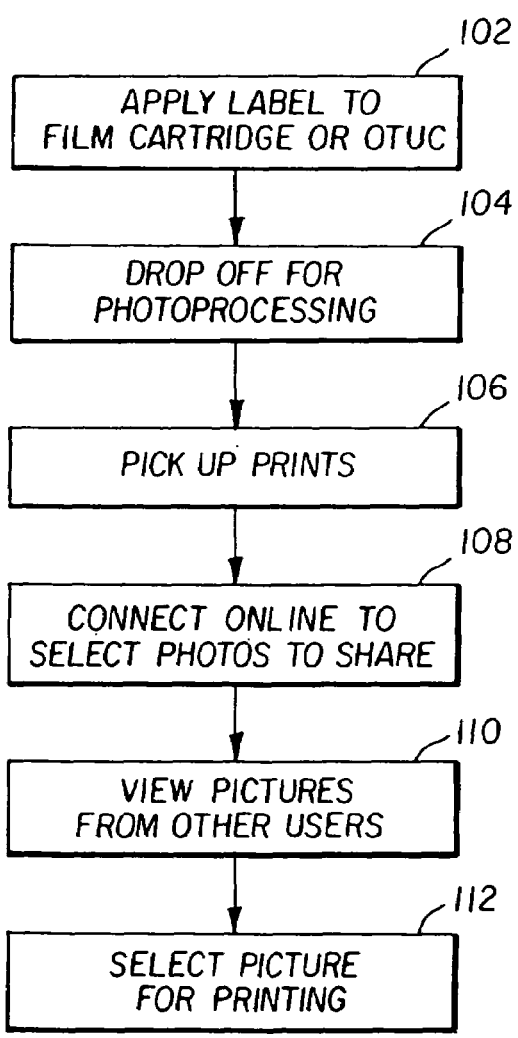
FIG. 6b is a flow chart showing the steps in the method that an event participant completes according to the present invention.

Referring to FIGS. 6a-b, the operation of the system according to the present invention will now be described. As shown in FIG. 6a, the event host purchases (96) a package 30 of transaction cards 10. The host hands out the cards (98) to the photographers at the event. At some point before or after the event, the event host registers (100) over the Internet 50 with the network photo service provider 60 by filling out a registration form provided on-line by the network photoservice provider 60.

Turning to FIG. 6b, a photographer who received a transaction card 10 at the event, applies (102) the adhesive label 18 to his film 24 or one time use camera 26, and drops off (104) the film 24 or one time use camera 26 at the photofinisher 34. The photofinisher 34 inputs the URL 12 and user ID 14 into the photofinishing system by scanning the bar code 20 from the adhesive label 18. Alternatively, the URL 12 and user ID 14 can be carried on the transaction card 10 by a magnetic stripe 28 as shown in FIG. 3, which is scanned by a magnetic card reader 204 (See FIG. 17) located at a film drop off location. An example of a film drop off location which integrates a retail terminal 206 with a magnetic card reader 204 is the Kodak Picture center. A label is printed having the URL 12 and the user ID 14 and the label is attached to a photofinishing envelope 210.

After the film has been developed, the photographer picks up (106) the prints and processed film. By the time the prints are ready, the photographer can connect (108) to the network photoservice provider 60 using the user ID 14 and password 22 on the transaction card 10 to select the images that are to be shared with the other photographers at the event. The photographer reviews the images displayed on the monitor of user workstation 70 and indicates the images that he desires to share with the others, for example, by checking a box associated with each image. Alternatively, he could check a single box indicating that he wishes to share all of the images.

After the images that will be shared have been selected by the participants, they can view each others selected digital images (110), (both his and others at the event), that were captured at the event, and select images for printing (112) and order reprints and other articles. In the event that a user fails to designate digital images for access to all cardholders within a predetermined period of time, access may be granted by the network photoservice provider 60 to all cardholders to all digital images stored by the user. Taking action after a predetermined time period is function that can be provided by computer 64 of the network photoservice provider 60 as is known the computer art.

Alternatively, the photographer can contact the network photoservice provider 60 prior to receiving his prints to see if the images are available. The photographer can also employ his user ID 14 and password 22 to track the progress of his photofinishing order, since the link to the user ID 14 is established at the photofinisher 34 and can be made available to the network photo service provider 60 as soon as the adhesive label 18 is scanned. All other services, such as retrieving a low resolution digital image that are normally provided by network photoservice providers 60 are also available to the photographer with respect to all of the images taken at the event.

Figure 7:
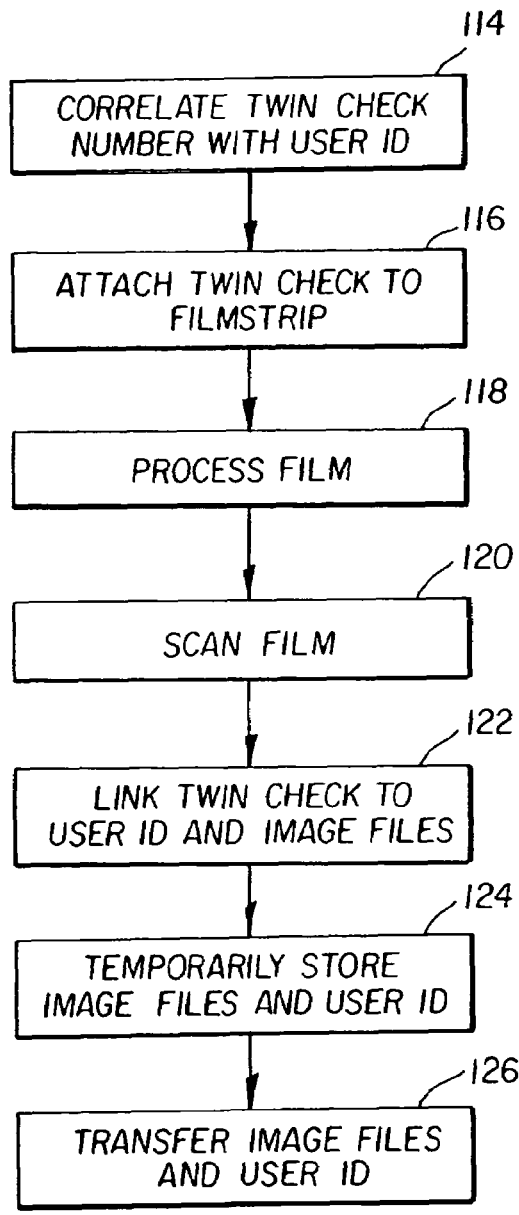
FIG. 7 is flow chart showing the steps in the method that a photofinisher completes according to the present invention.

Referring to FIG. 7, the steps in the method that a photofinisher 34 completes according to the present invention will be described. The photofinisher 34 associates a twin check number (114) with the user ID 14 that was scanned from the adhesive label 18 attached to film cartridge 24 or the magnetic stripe 28 on the transaction card 10. The twin check, which is a sequential number, is attached (116) to the film strip and the photofinishing envelope 210. The film is then processed (118), scanned (120), and the twin check code is read and the user ID 14 is associated (122) with the digital image files. The digital image files and associated user ID 14 are temporarily stored (124) in memory 46 and subsequently transferred (126) to the image database 68 at the network photoservice provider 60.

Figure 8:
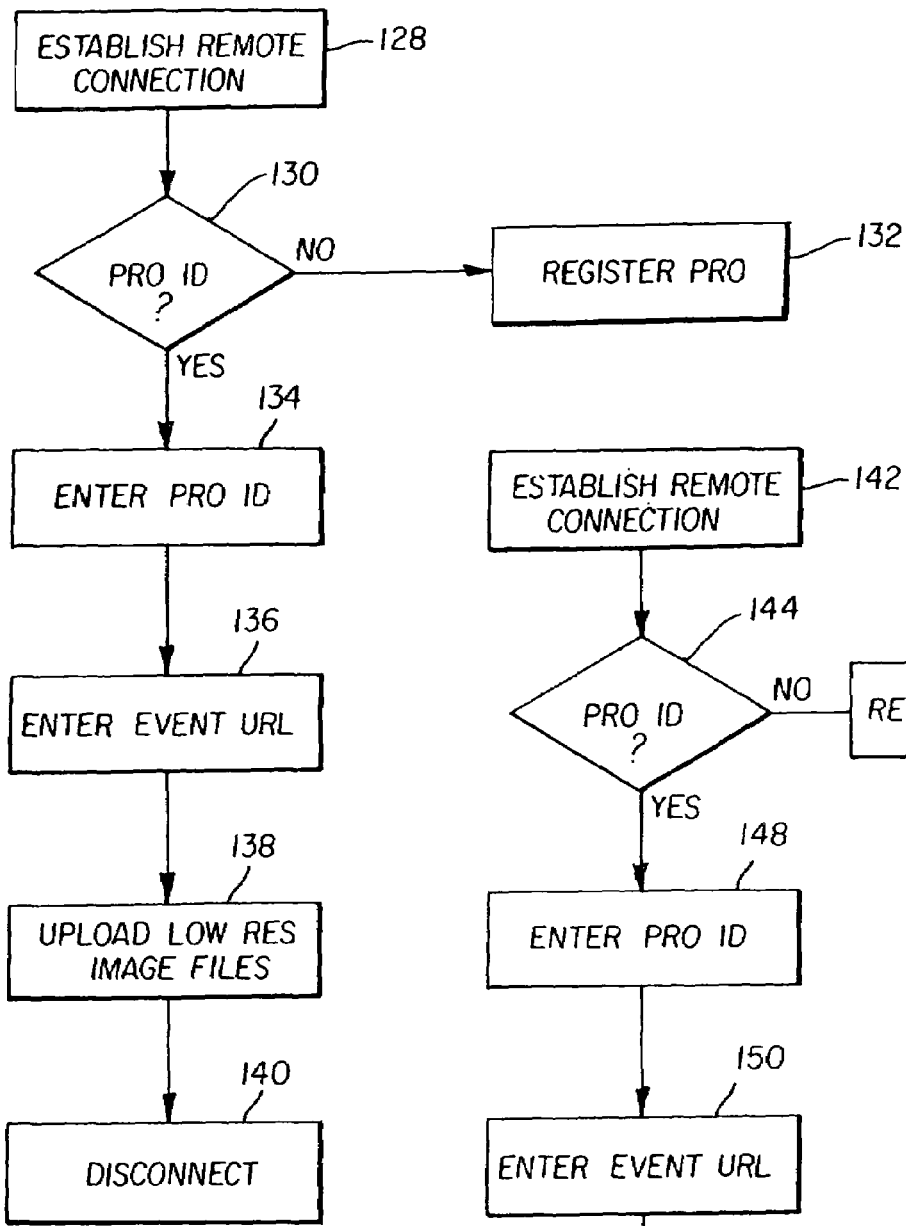
FIG. 8 is a flow chart showing the steps of a method for providing professional images of an event for sale with a consumer photo database of the event according to the present invention.

Referring to FIG. 8, the steps in the method of uploading images from a professional image database 94 containing images of an event to a consumer database built according to the present invention will be described. A professional photographer, who has attended the event and received a transaction card 10 or copied the URL 12 from a transaction card 10, establishes a remote connection (128) to the network service provider 60. The network photoservice provider 60 requests a professional identification (Pro ID) (130) indicating that the professional photographer has been previously associated with the network photoservice provider 60. If the professional does not have a Pro ID, the network service provider 60 registers (132) the professional photographer. Otherwise, the professional enters his Pro ID (134), enters the event URL 12 (136) from the transaction card 10, and uploads (138) low resolution image files from professional image database 94 for display in the area of the URL 12 reserved for digital images selected to be shared. After completing the upload process (138), the professional photographer disconnects (140) from the network photoservice provider 60.

It should be noted that the effect of registration (132) permits the definition of the electronic finds transfer agreement for distribution of proceeds from the sale or use of images uploaded and originating from the professional image database 94. In a manner well understood in the electronic commerce art, brokerage fees are a form of revenue sharing where the network photoservice provider 60 collects a percentage of the revenue associated with a user's selection of a professional image to print for example before distributing the balance of the incurred fee to the professional photographer who has registered with the network photoservice provider 60.

Furthermore, it will be understood that fulfillment center 76 will access the URL of the professional image database 94 to download the appropriate high resolution digital image necessary for order fulfillment correlating to the user selected low resolution image resident at the network photoservice provider 60. It should be obvious to one skilled in the art that an event participant seeking fulfillment of an order including both consumer shared images and images from the professional image database 94 conducts only one distinct electronic transaction in the method of FIG. 8.

Figure 9:
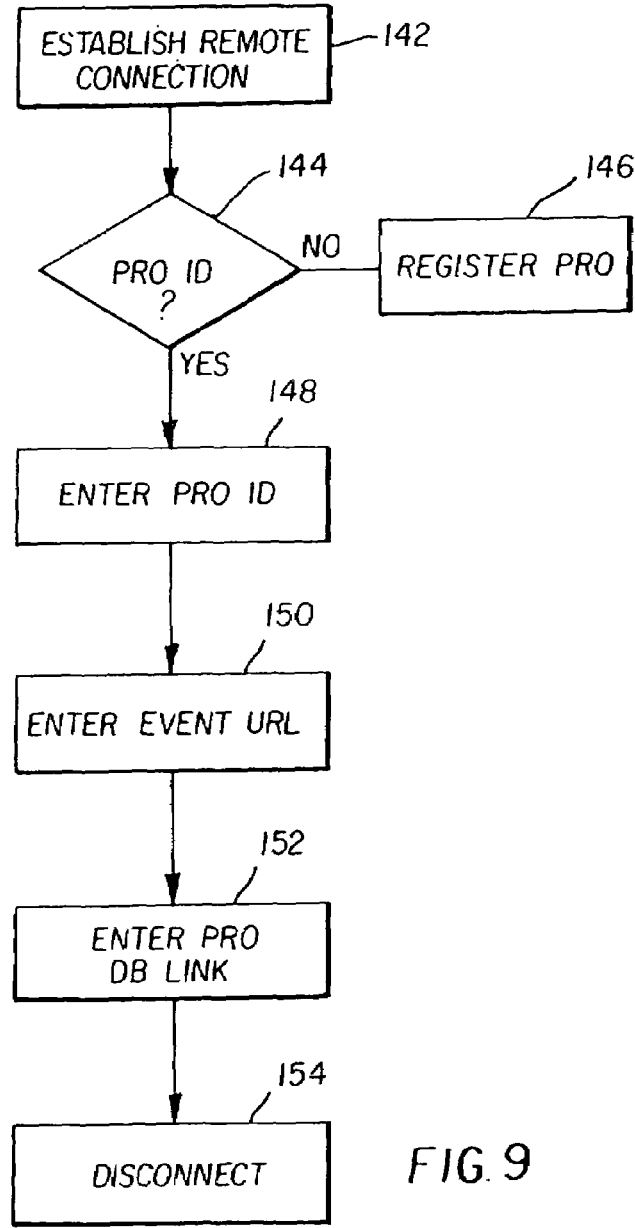
FIG. 9 is a flow chart showing the steps in an alternative method of connecting a professional image database containing images for sale of an event to a consumer database built according to the present invention.

Referring to FIG. 9, the steps in an alternative method of connecting a professional image database 94 containing images for sale of an event to a consumer database built according to the present invention will be described. A professional photographer who has attended the event and received a transaction card 10 or copied the URL 12 from a transaction card 10, establishes a remote connection (142) to the network service provider 60. The network service provider 60 requests a Pro ID (144) indicating that the professional photographer has been previously associated with the network photoservice provider 60. If the professional does not have a Pro ID, the network service provider 60 registers (146) the professional photographer. Otherwise, the professional enters his Pro ID (148), enters the event URL 12 (150) from the transaction card, and enters (152) the URL for his professional image database 94 before disconnecting (154) from network photoservice provider 60.

It should be noted that the effect of registration permits sharing of revenue associated with the sale or use of professional images from the professional image database 94. In operation, a user connecting with user workstation 70 to network photoservice provider 60 via Internet service provider 74 and Internet 50 will see an active link from the registered professional photographer which will transfer the user to the URL of the professional image database 94. In a manner well understood in the electronic commerce art, sites (URLs) that transfer users who subsequently purchase items at URL of the professional image database 94 earn a commission on the revenue generated by the transferred user. In this case, the professional photographer incurs the responsibility to track the path of users purchasing images to reimburse the transferring site such as the network photoservice provider 60. The user also completes a distinct electronic transaction with the professional photographer in addition to any electronic transaction conducted with the network photoservice provider.

Figure 10:
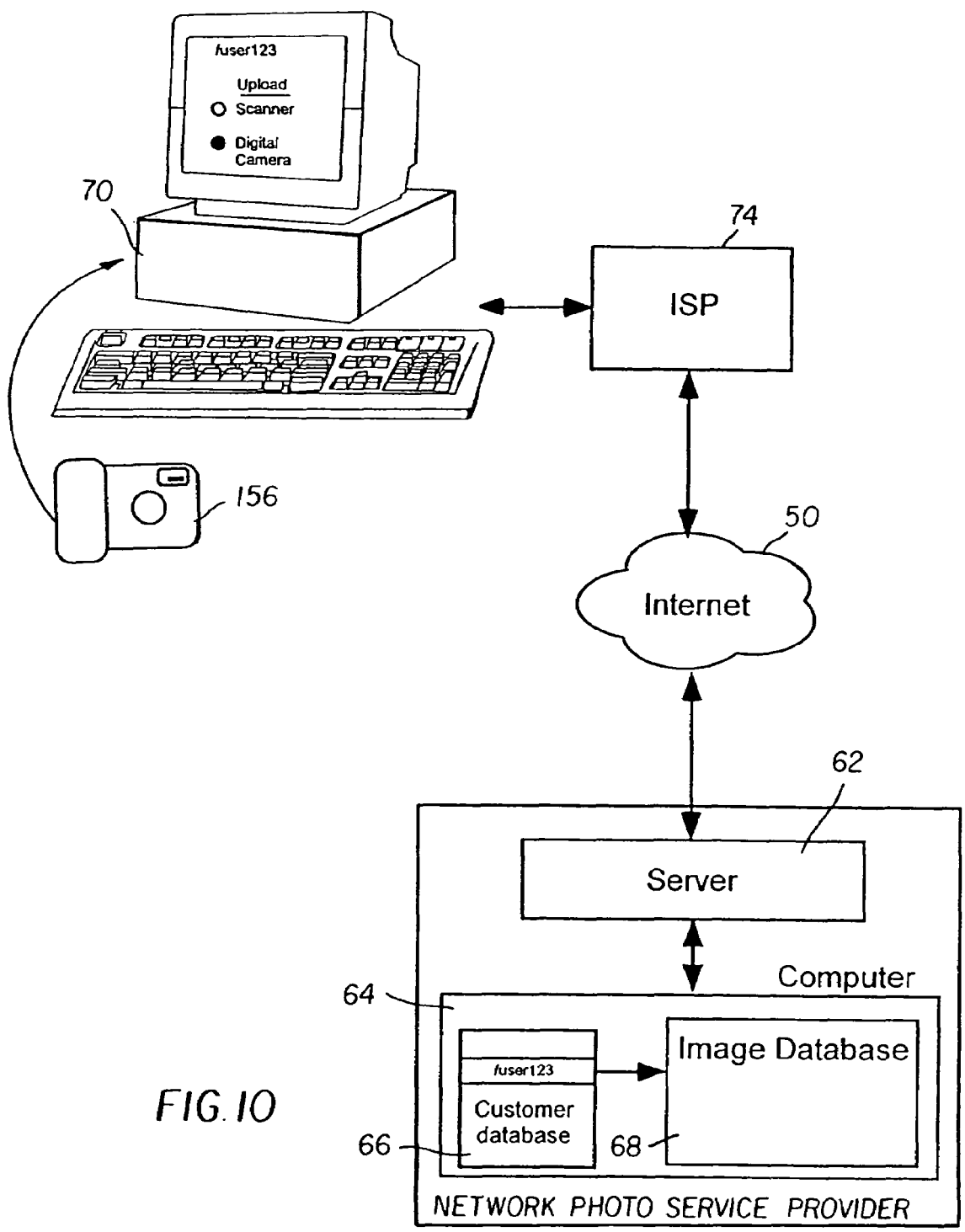
FIG. 10 is a block diagram showing the connection of an electronic camera user to a network photoservice provider for sharing images of event according to the present invention.

Referring to FIG. 10, a block diagram shows the connection of a user with an electronic camera 156 to a network photoservice provider 60 for sharing images of event captured electronically according to the present invention. It will be understood that electronic camera 156 will include those cameras that at least electronically capture an image of a scene without the use of chemical amplification of incident light as achieved by silver halide based films.

The connection of the electronic camera 156 to user workstation 70 is well known in the art. For example, the DC210 camera manufactured by the Eastman Kodak Co. allows the user to extract a removable memory card (not shown) for insertion into user workstation 70. Alternatively, cables for transferring serial data streams in an RS-232 fashion between electronic cameras 156 and user workstation 70 are also well known. This established protocol is also well know with wireless serial transmissions involving the use of infrared light or radio frequencies (RF).

It will be understood that user workstation 70 can include a scanner (not shown) of the flatbed type and/or the film type where the user can provide digital image files without the need of photofinisher 34. Furthermore, providing these digital images files from devices that readily convert analog images to digital image files are considered within the scope of this invention.

Continuing on with FIG. 10, a user connects to the network photoservice provider 60 through ISP 74 and Internet 50 and after establishing a connection, enters the user ID 14 and password 22 from transaction card 10. Following validation of the user ID 14 and password 22, digital image files transferred to user workstation 70 are uploaded to the shared image area of URL 12 of network photoservice provider 60. Network photoservice provider 60 must then create a low resolution file for viewing and selecting within the shared image area of URL 12. Since uploading is a selection process, there is no need for further involvement of a user supplying digital image files directly from a user workstation 70. Such a user begins creating an order from images available in the shared image area of URL 12 immediately after uploading his digital image files.

Figure 11:
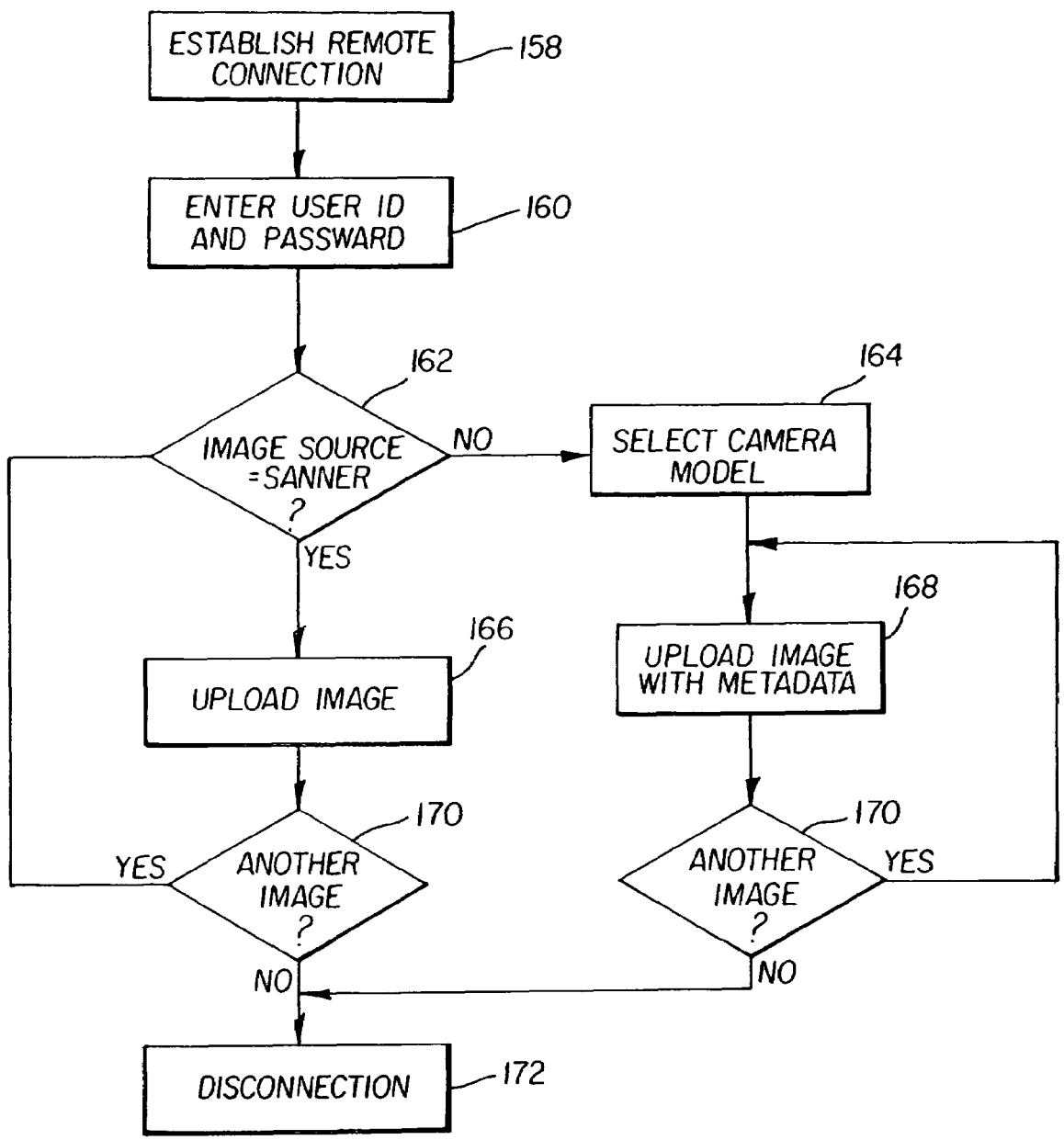
FIG. 11 is a flow chart showing the steps in the method of uploading images from a digital camera to a network photo service provider hosting images from an event according to the present invention.

Referring now to FIG. 11, a flow chart shows the steps in the method of uploading images from a user workstation 70 to a network photo service provider hosting images from an event according to the present invention. A user wishing to upload images begins by establishing a remote connection (158) to the network service provider 60. The network photoservice provider 60 requests a user ID 14 and password 22 to validate the connection to the event which the user complies with (160). The user is then prompted (162) to see if the images to be uploaded are from a scanner or an electronic camera. If the images to be uploaded are from a scanner the user is prompted (166) to identify and upload the image. Upon completion of the upload, the user is again prompted (170) if there is another image to upload and the sequence begins again until all images have been uploaded successfully. When the image is not sourced from a scanner, the system prompts (164) the user to select the camera model used to capture the image with. This allows the system to anticipate the file format to be uploaded and make any adjustments to the image for presenting in the shared image area of URL 12. Once the camera has been selected, the upload process begins (168) by identifying and uploading a specific image. Upon successful upload completion, the user is prompted (172) to see if there is another image to upload and the sequence repeats itself until all images are successfully uploaded. The user has the option to proceed to the shared image area to construct an order from the shared images or disconnect (174) from network photoservice provider 60.

Figure 12:
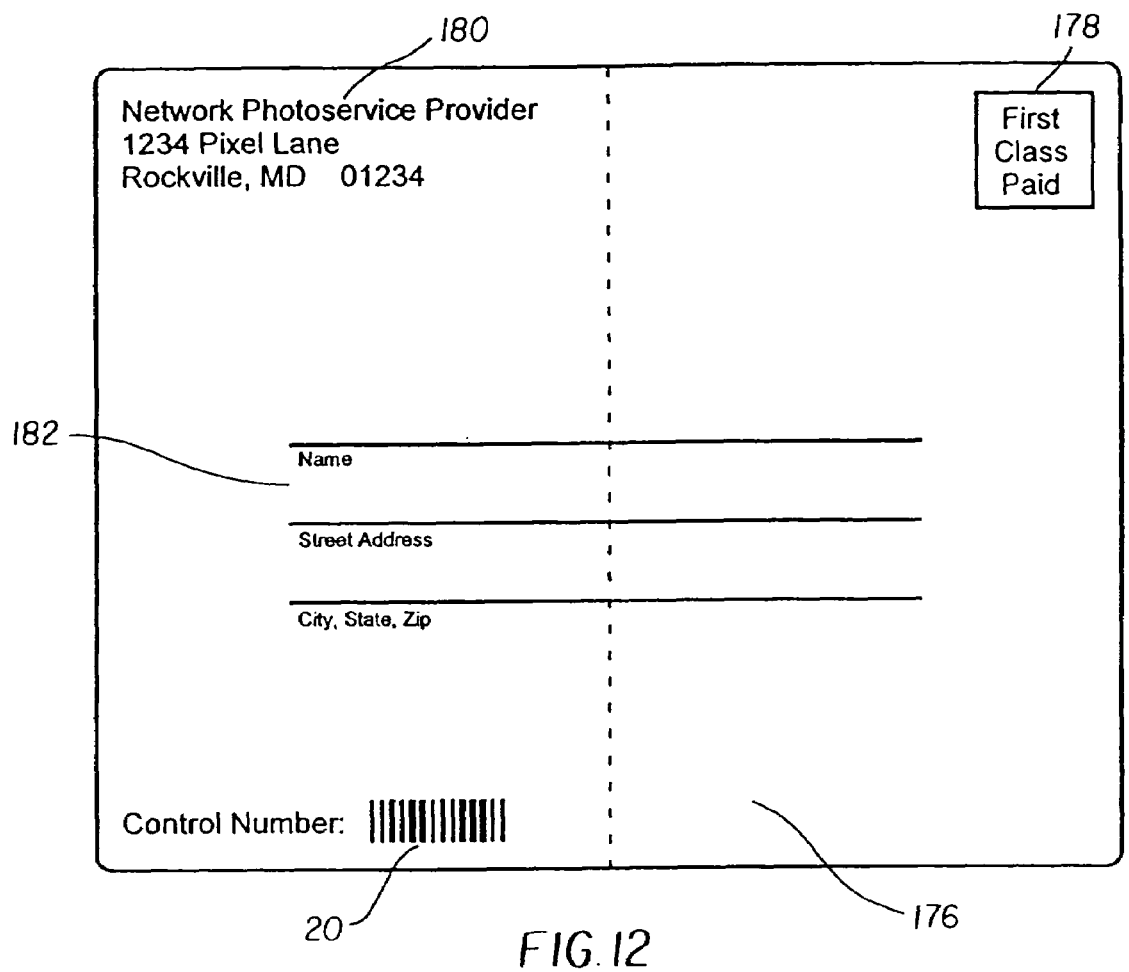
FIG. 12 is a mail-in registration card according to the present invention.
Figure 13B:
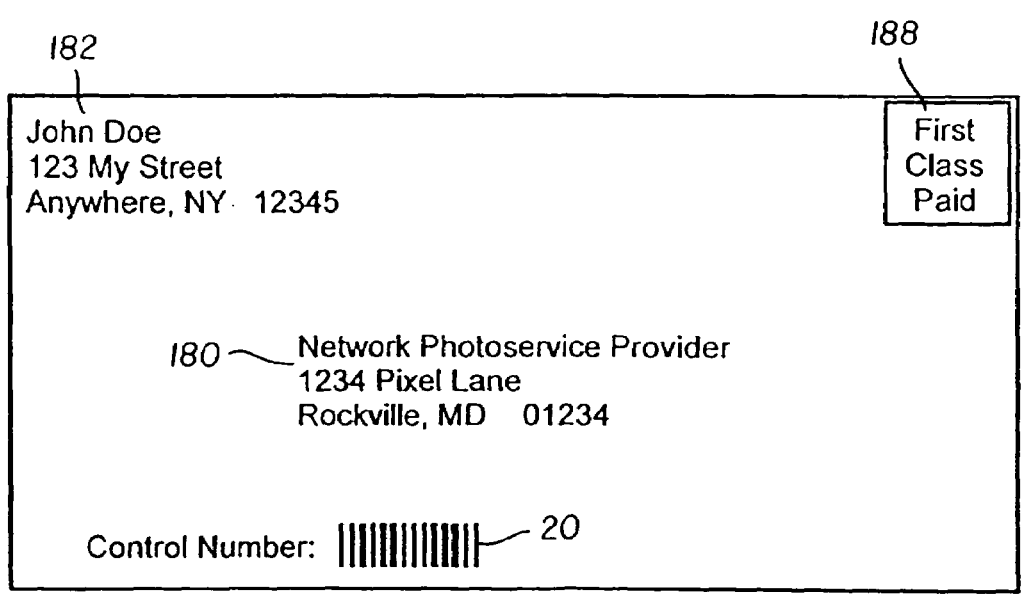
FIG. 13b is a mailing form of the index print of FIG. 13a for mailing back to a fulfillment center for receiving printed images according to the present invention.

Turning now to FIG. 12, an event registration card 176 is shown for permitting the sharing of images from the shared image area of URL 12 with users who do not have access to remote electronic connections or the Internet 50. Event registration card 176 includes at least the address 180 of the network photoservice provider 60, first class metered postage 178, registrant address 182 to be filled out by the registrant, and barcode 20 which has encoded the URL 12 and user ID 14. Event registration cards can be included in the pack 30 of transaction cards 10 to accommodate those event participants who don't have access to the Internet 50. Once the event registration card 176 is received by the network photoservice provider 60, the event participant will receive index prints 184 discussed further with respect to FIG. 13 using a method according to the description of FIG. 14.

Figure 13A:
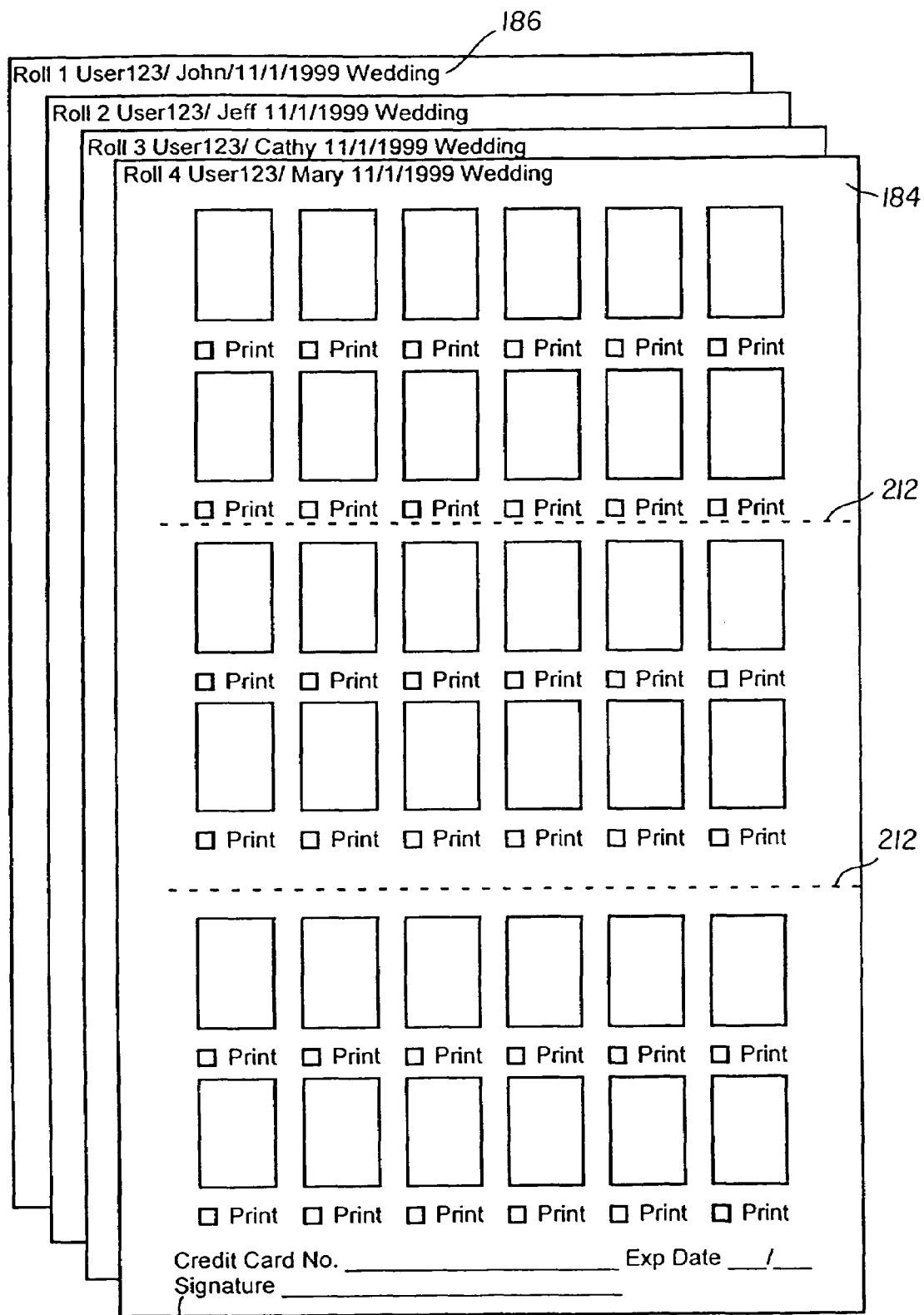
FIG. 13a is an index print for selecting images from an event without a computer according to the present invention.

In FIG. 13a, the front view of an index print 184 is shown for selecting images 214 with selection boxes 216 from an event associated with URL 12 and User ID 14 without the aid of a user workstation 70 connected to the network photoservice provider 60. The index print 184 is received in the mail by an event participant who has registered with the network photoservice provider 60 by mailing in the event registration card 176. Index print 184 includes an event title 186 that further includes any photographer information that is input at the time the specific event photographer connects to the URL 12 and makes his selections to share with the other event participants. A registered event participant receives index print 184, marks the selection boxes 216 indicating those which are desirable to print, and provides information in payment field 220. Furthermore, index print 184 has preprinted fold lines 212 which creates a mailing form shown in FIG. 13b that includes prepaid return postage 188, the address 218 of the fulfillment center 76, the registrant address 182, and the bar code 20 which can be automatically read and fulfilled when returned to the fulfillment center 76. Automatic fulfillment is a scanning process that identifies the marked selection boxes 216 and the URL 12 and user ID 14 which connects the fulfillment center 76 to the network photoservice provider 60. Form scanning processes are well known in the art of order fulfillment with an example of such a technique being used by the BMG Music service to fulfill orders for tapes or compact discs. Alternatively the indication of the images to be printed or other photoservices to be provided can be communicated by telephone to the photoservice provider or fulfillment center and indicating the photoservices desired via voice or touchtone response to a recorded program. The marked index print may also be faxed to the photoservice provider or fulfillment center.

Figure 14:
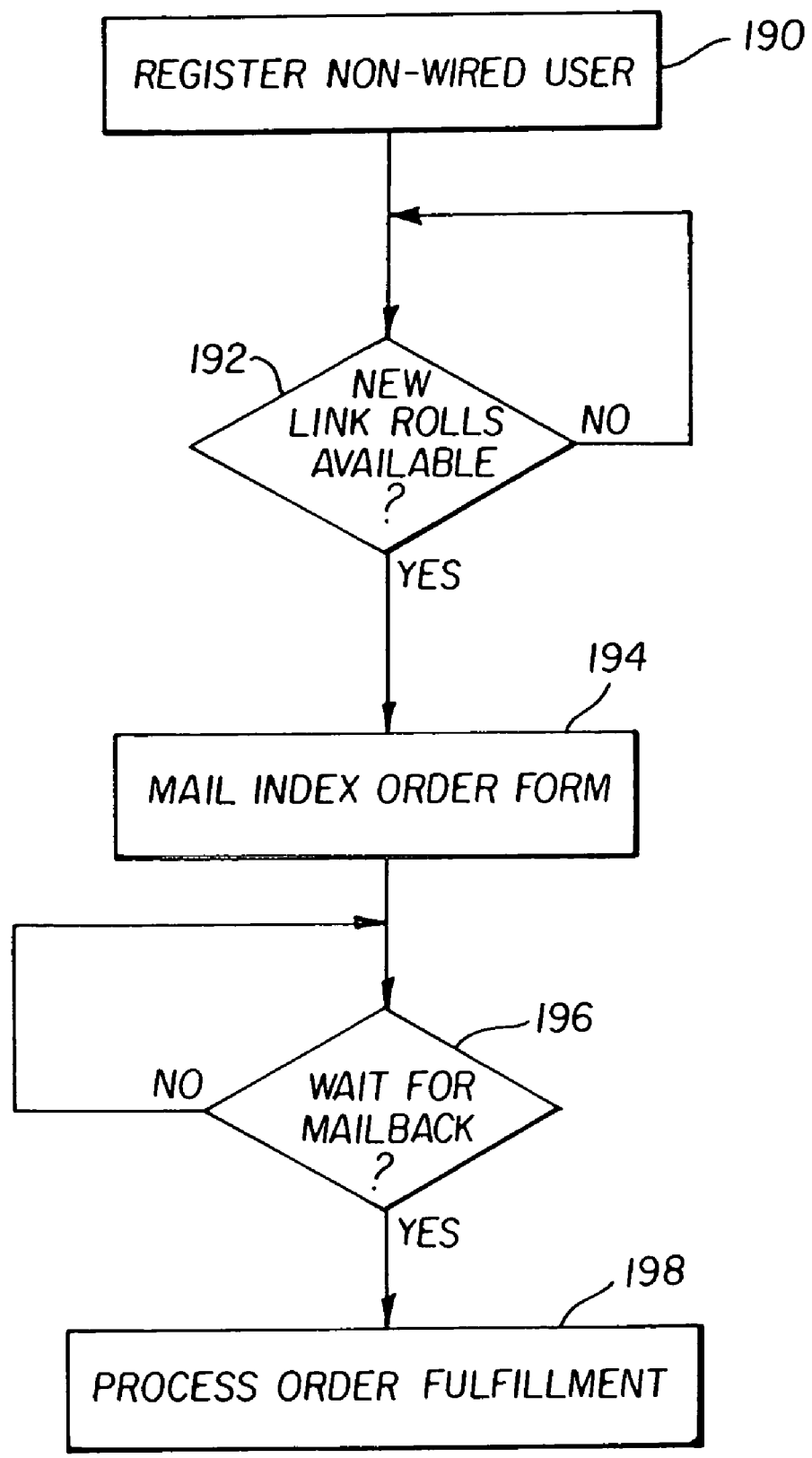
FIG. 14 is a flow chart showing the steps in the method of the network photoservice provider 60 soliciting printed image sales from event participants that do not have access to Internet 50.
Figure 15:
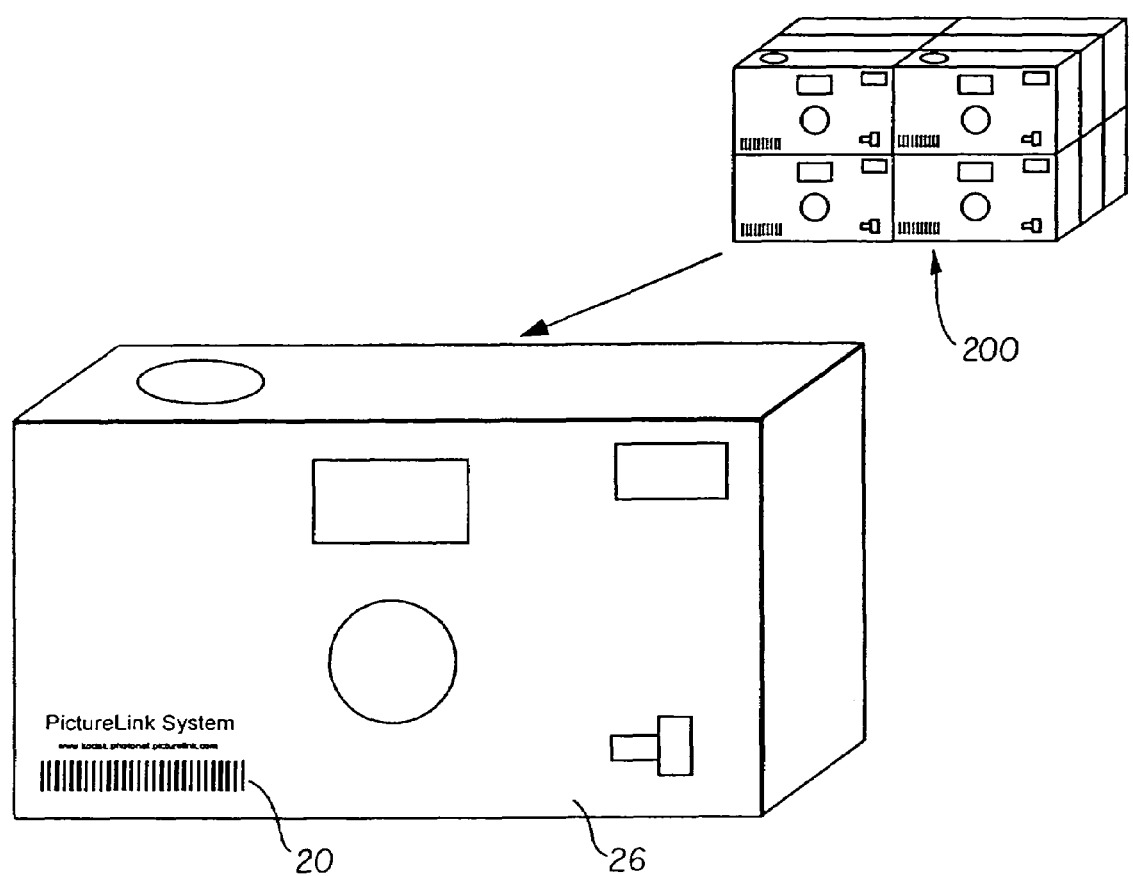
FIG. 15 shows a package of one time use cameras preconfigured to a common address with a network photo service provider according to the present invention.

Turning to FIG. 14, a flow chart shows the steps of the method of the network photoservice provider 60 in coordination with fulfillment center 76 soliciting print sales from event participants that do not have access to Internet 50. This is accomplished by the registration (190) of such event participants upon receiving the event registration card 176 at the network photoservice provider 60. The event participant's registration information is entered into a database in a standard fashion with a relationship created to the event associated with URL 12. As film cartridges 24 or one time use cameras 26 that were used at the event are dropped off with photofinisher 34, they get scanned to URL 12 and user ID 14 as defined by the transaction card 10 of each participant. Once the participant has selected images to be shared, the system is triggered (192) to create a new index print 184 and mail it (194) to the registered event participants without Internet 50 access. The index print 184 is mailed back (196) to the fulfillment center 76 which in coordination with the network photoservice provider 60 fulfills the order (198) from the images stored in the shared image area of URL 12. As shown in FIG. 15, a package 200 of one time use cameras 26 is shown which are preconfigured to a common URL 12 with a network photo service provider 60 according to the present invention. The bar code 20 which encodes the user ID 14 and URL 12 is printed on the outer package component of one time use camera 26. This arrangement provides an alternative effective arrangement to affixing the bar code 20 as a label.

Figure 16:
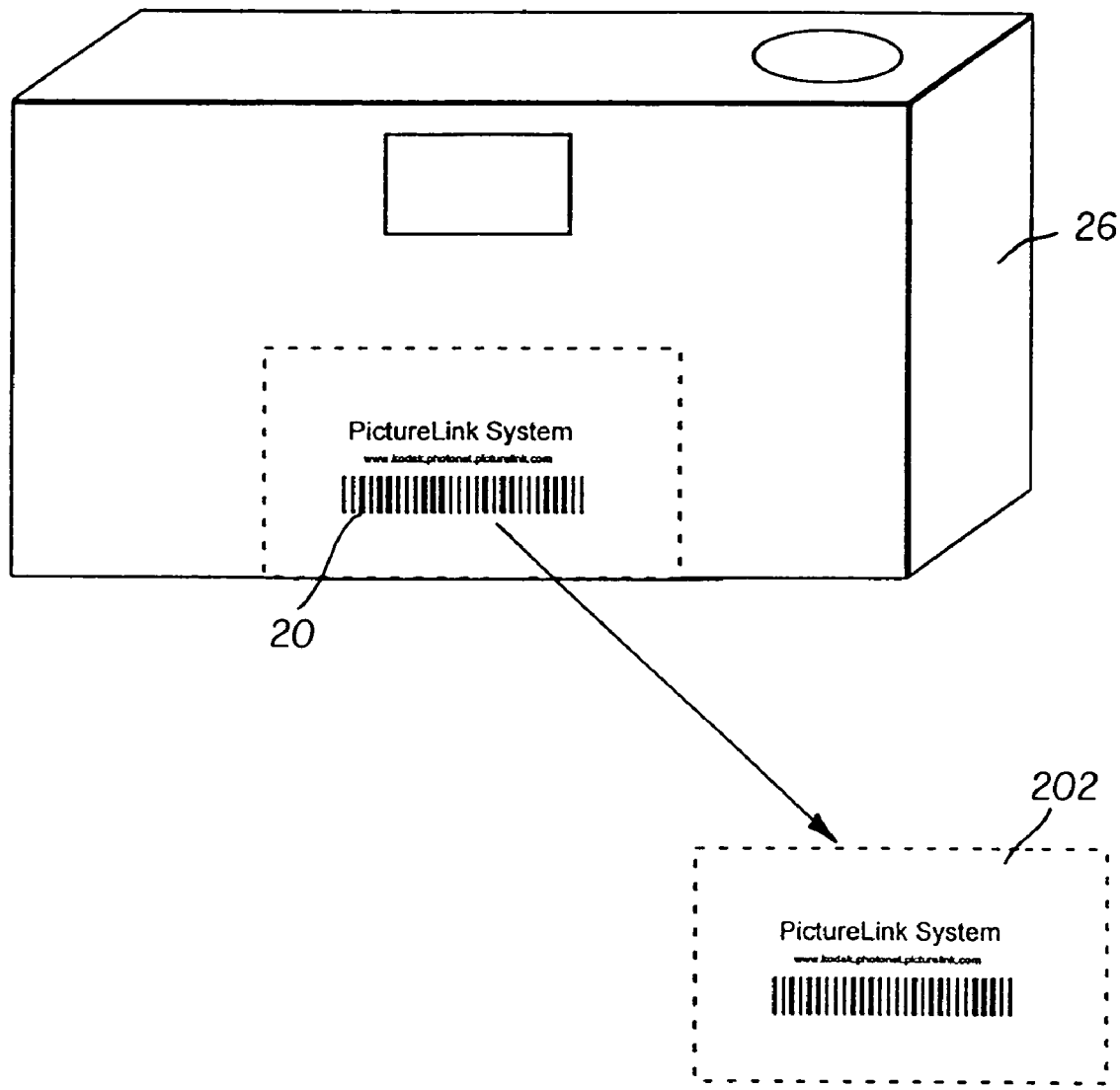
FIG. 16 show a tear off section of packaging with a bar code from a one time use camera according to the present invention.

Turning to FIG. 16, a tear off section 202 of the outer package component of the one time use camera 26 of FIG. 15 is shown. In this arrangement, the tear off section 202 is kept by the customer as a receipt with the instructions to access his images at URL 12 and user ID 14 with password 22.

Figure 17:
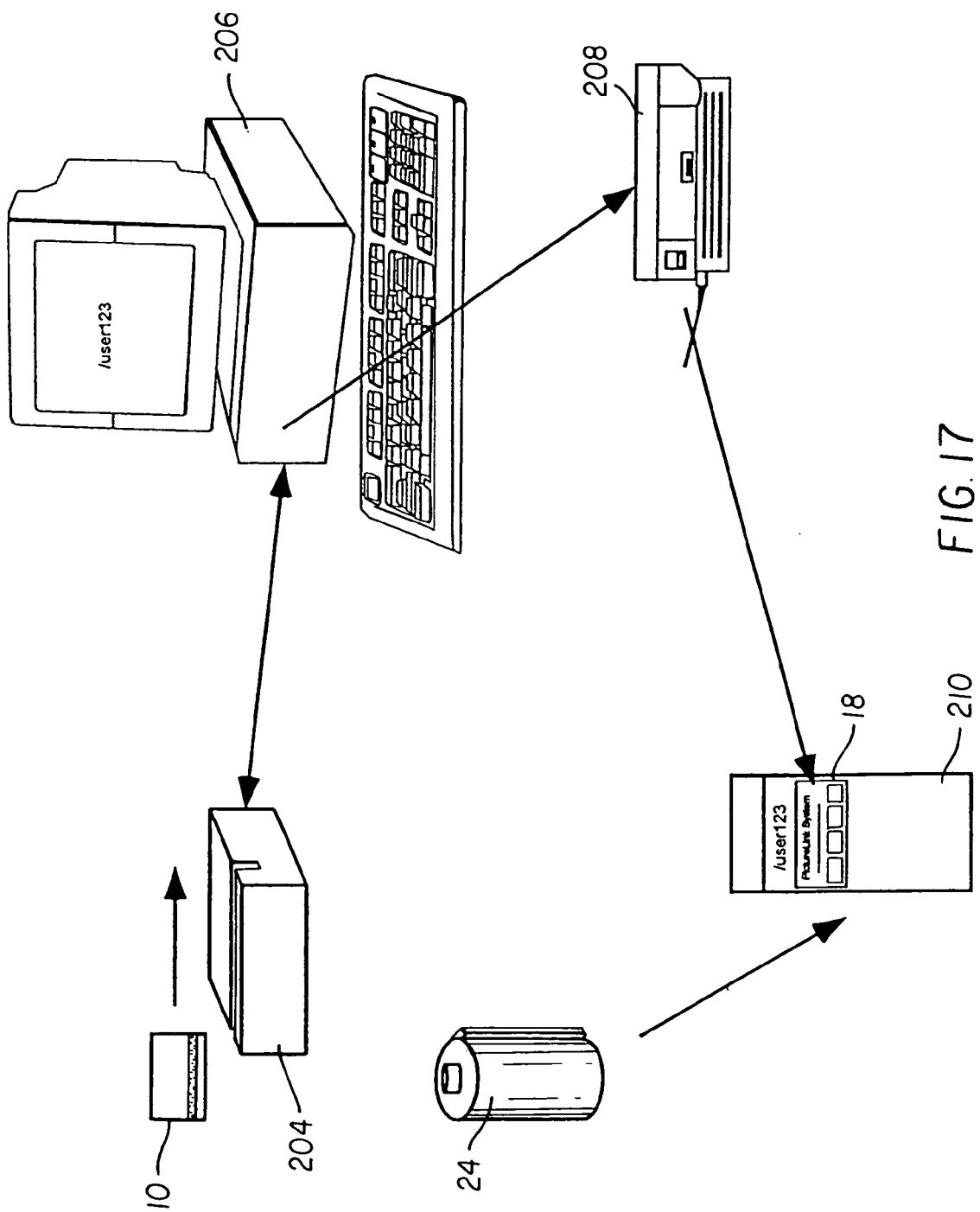
FIG. 17 is a schematic diagram showing a system for practicing an alternative embodiment of the present invention.

FIG. 17 is a schematic diagram showing a system for practicing an alternative embodiment of the present invention. According to this embodiment, the magnetic stripe 28 discussed with reference to FIG. 3 is scanned by a magnetic card reader 204. The URL 12 and user ID 14 are read from the magnetic stripe 28 and input into a retail terminal 206. The retail terminal 206 drives printer 208 to print an adhesive label 18 with a bar code 20 containing the URL 12 and the user ID 14. The label 18 is affixed to processing envelope 210 for receiving the film cartridge 24. Alternatively, printer 208 can print directly onto the processing envelope 210.

Figure 18:
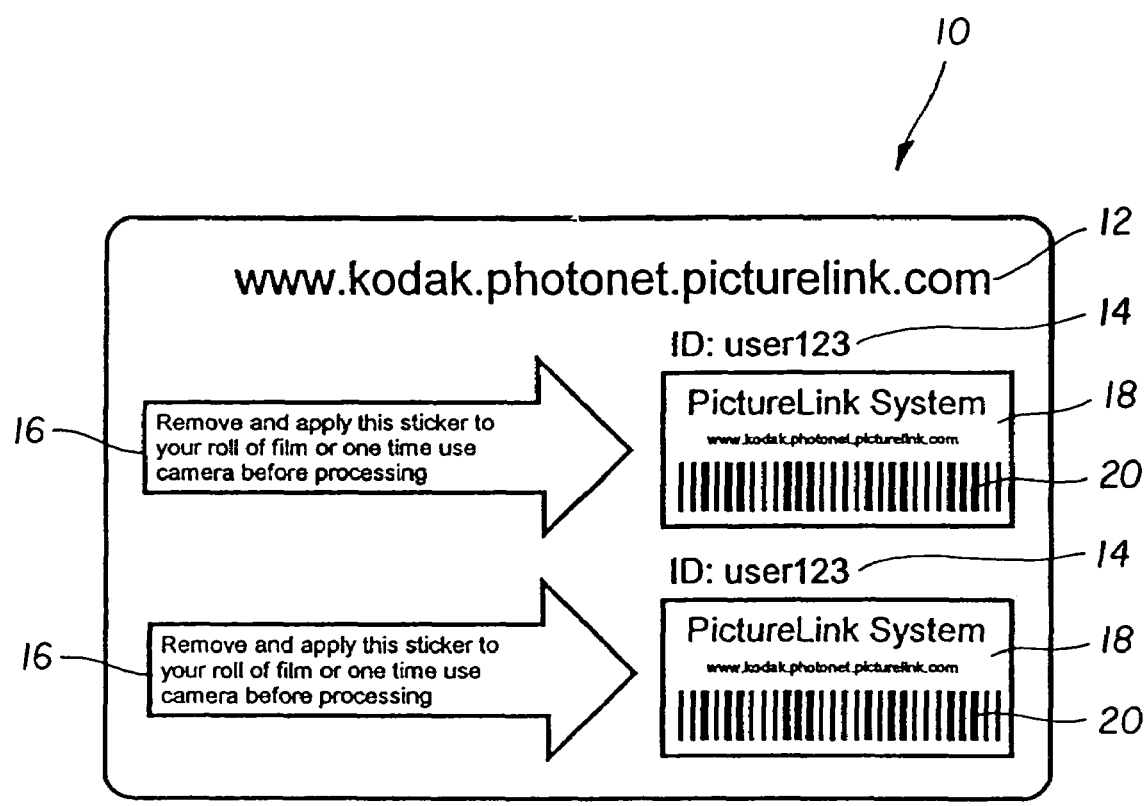
FIG. 18 shows a transaction card according to an alternative embodiment of the present invention.

FIG. 18 shows an alternative embodiment of a transaction card according to an alternative embodiment of the present invention having more than one removable adhesive label 18 on the card such that adhesive labels for more than one roll of film can be scanned to the same user ID 14 and password 22 at URL 12. Such a transaction card 10 can be used by an individual user to store at a single location, images obtained from multiple rolls of film over a period of time.

The invention has been described in detail with particular reference to certain preferred embodiments thereof, but it will be understood that variations and modifications can be effected within the spirit and scope of the invention.

PARTS LIST 10 transaction card
12 universal resource locator (URL)
14 user ID
16 instructions
18 adhesive label
20 bar code
22 password
24 film cartridge
26 one time use camera
28 magnetic stripe
30 package
32 display rack
34 photofinisher
36 film preparation station
38 film processor
40 film scanner
42 label scanner
44 computer
46 memory
48 web server
50 Internet
52 card manufacturer
54 database
56 web server
58 computer
60 network photoservice provider
62 web server
64 computer
66 customer database
68 image database
70 user workstation
72 web server
74 Internet service provider
76 fulfillment center
78 web server
80 job queue
82 digital output producer
84 prints
86 compact discs (CDs)
88 professional photo studio
90 studio workstation
92 professional film scanner
94 pro image database
96 purchase cards step
98 hand out cards step
100 register event host step
102 application step
104 drop off film step
106 pick up prints step
108 connect to network step
110 view others pictures step
112 order reprints step
114 associate twin check number step
116 attach twin check step
118 process film step
120 scan film step
122 link twin check to image files step
124 store image files and user ID step
126 transfer image files step
128 establish remote connection step
130 request Pro ID step
132 register Pro ID step
134 enter Pro ID step
136 enter event URL step
138 upload images step
140 disconnect from network step
142 establish remote connection step
144 request Pro ID step
146 register Pro ID step
148 enter Pro ID step
150 enter event URL step
152 enter pro image data base URL step
154 disconnect step
156 electronic camera
158 establish remote connection step
160 enter user ID and password step
162 prompt to see if images are available step
164 select camera model step
166 upload images step
168 begin upload process step
170 check for additional image step
172 check for additional image step
174 disconnect step
176 event registration card
178 first class metered postage
180 address
182 registrant address
184 index print
186 title
188 first class return postage
190 registration step
192 create new index print step
194 mailing step
196 return mail step
198 fulfill order step
200 package
202 tear off section
204 magnetic card reader
206 retail terminal
208 printer
210 photoprocessing envelope
212 fold line
214 images
216 selection boxes
218 address
220 payment field

What is claimed is:

1. A method for providing access to a collection of digital images of a sponsored event, comprising the steps of:

a) providing, by a sponsor, a plurality of transaction cards one for each of a plurality of attendees at the sponsored event, each of the transaction cards having printed thereon a URL indicating a location of the collection of digital images on the Internet relating to the sponsored event and each having printed thereon a common user ID and a corresponding different password for the common user ID;

b) at least one of the plurality of attendees who has received one of the transaction cards using the common user ID and a corresponding different password for the common user ID transferring a set of digital images of the sponsored event to the location of the collection of digital images on the Internet indicated by the URL printed on said one of the transaction cards; and c) at least another one of the plurality of attendees who has received another one of the transaction cards using the common user ID and a corresponding different password for the common user ID viewing the images at the location of the collection of digital images on the Internet indicated by the URL printed on said another one of the transaction cards.

2. The method claimed in claim 1 further comprising the step of providing a selection of photoservices relating to the images.

3. A kit containing a plurality of transaction cards, each of the transaction cards comprising:

a) a support sheet upon which is printed instructions for use of the transaction card, a URL identifying a network photoservice provider, a user ID common to all of the transaction cards, and a password for the common user ID that is different from the password printed on all of the other transaction cards in the kit, b) a magnetic stripe disposed thereon, the stripe having recorded thereon the URL, the common user ID and the different password.

4. The kit of claim 3 wherein the support sheet is for use by a camera user, which camera contains images captured by the user, for accessing the images at a network location indicated by the URL printed on the support sheet, said accessing gained via the common user II) and the different password, and wherein the transaction card is provided by the user to the network photoservice provider identified on the support sheet for the network photo service provider to upload to the network location indicated by the URL the digital images captured by the user, said uploading performed via the magnetic stripe disposed on the transaction card.

* * * * *